(12) United States Patent
Toumiya

(10) Patent No.: US 6,751,767 B1
(45) Date of Patent: Jun. 15, 2004

(54) TEST PATTERN COMPRESSION METHOD, APPARATUS, SYSTEM AND STORAGE MEDIUM

(75) Inventor: Tamaki Toumiya, Tokyo (JP)

(73) Assignee: NEC Electronics Corporation, Kanagawa (JP)

(*) Notice: Subject to any disclaimer, the term of this patent is extended or adjusted under 35 U.S.C. 154(b) by 458 days.

(21) Appl. No.: 09/671,368

(22) Filed: Sep. 28, 2000

(30) Foreign Application Priority Data

Sep. 29, 1999 (JP) .......................................... 11-276046

(51) Int. Cl.$^7$ ......................... G01B 31/28; G01B 31/02
(52) U.S. Cl. ........................ 714/738; 714/32; 324/73.1; 371/27
(58) Field of Search ................................ 714/738, 739, 714/32, 726; 324/73.1; 371/27

(56) References Cited

U.S. PATENT DOCUMENTS

| | | | | |
|---|---|---|---|---|
| 5,416,783 A | * | 5/1995 | Broseghini et al. | 714/728 |
| 5,719,881 A | * | 2/1998 | Yonetoku | 714/25 |
| 5,883,906 A | * | 3/1999 | Turnquist et al. | 714/738 |
| 6,061,818 A | * | 5/2000 | Touba et al. | 714/739 |
| 6,182,258 B1 | * | 1/2001 | Hollander | 714/739 |
| 6,212,667 B1 | * | 4/2001 | Geer et al. | 716/6 |
| 6,334,199 B1 | * | 12/2001 | Ono et al. | 714/728 |
| 6,393,594 B1 | * | 5/2002 | Anderson et al. | 714/738 |
| 6,401,226 B1 | * | 6/2002 | Maeno | 714/728 |
| 6,449,743 B1 | * | 9/2002 | Hosokawa | 714/738 |
| 6,493,841 B1 | * | 12/2002 | Kim et al. | 714/741 |
| 6,499,127 B1 | * | 12/2002 | Kim et al. | 714/739 |

FOREIGN PATENT DOCUMENTS

| | | |
|---|---|---|
| JP | A 2-1571 | 1/1990 |
| JP | 5119122 | 5/1993 |
| JP | A 8-15388 | 1/1996 |
| JP | 8212799 | 8/1996 |
| JP | 11139144 | 5/1999 |
| JP | A 11-265980 | 9/1999 |

OTHER PUBLICATIONS

Michael H. Schulz et al., "SOCRATES: A Highly Efficient Automatic Test Pattern Generation System," IEEE Transactions of Computer–Aided Design, vol. 7, No. 1, Jan. 1988, pp. 126–137.

Seiji Kajihara et al., "Cost–Effective Generation of Minimal Test Sets for Stuck–at Faults in Combinational Logic Circuits," IEEE Transactions on Computer–Aided Design of Integrated Circuits and Systems, vol. 14, No. 12, Dec. 1995, pp. 1496–1504.

LSI Design Article, pp. 112–116, 123–125 and 160–167.

* cited by examiner

Primary Examiner—David Ton
Assistant Examiner—Anthony T. Whittington
(74) Attorney, Agent, or Firm—Young & Thompson

(57) ABSTRACT

A system and method for test pattern compression includes a local CPU for dividing faults into a plurality of fault groups, assigning the fault groups to respective remote CPUs, that are connected to the local CPU in parallel with each other. Each remote CPU generates test patterns having undefined values assigned to pins of the logic circuit that do not participate in fault detection. The local CPU acquires pluralities of test patterns of the remote CPUs, generates new test patterns obtained by merging those test patterns that have identical pattern numbers among the pluralities of test patterns, and attempts to merge these newly generated test patterns.

23 Claims, 12 Drawing Sheets

FIG. 4

(a) PATTERNS BEFORE COMPRESSION

| 0 | 1 | 1 | 0 | 1 | 0 | 1 | 0 | 0 |
|---|---|---|---|---|---|---|---|---|
| 1 | X | 0 | 0 | 0 | 0 | 1 | 1 | 0 | 1 |
| 1 | 0 | 1 | 0 | 1 | 0 | 1 | X | 1 | 1 |

REMOTE CPU #1 → FAULT SIMULATION AND ASSIGNMENT OF UNDEFINED VALUES →

TEST PATTERN #1

| 0 | 1 | X | 1 | X | X | X | 0 | X | (1) |
| X | X | 0 | X | 0 | 0 | 1 | 1 | 0 | 1 | (2) |
| 1 | X | X | 0 | X | 0 | 1 | X | X | 1 | (3) |

REMOTE CPU #2 → FAULT SIMULATION AND ASSIGNMENT OF UNDEFINED VALUES →

TEST PATTERN #2

| 0 | X | X | X | 0 | 1 | 0 | 1 | 0 | X | (4) |
| 1 | X | 0 | 0 | 0 | 1 | 1 | X | 1 | (5) |
| X | 0 | X | 0 | X | X | X | X | 1 | (6) |

REMOTE CPU #3 → FAULT SIMULATION AND ASSIGNMENT OF UNDEFINED VALUES →

TEST PATTERN #3

| X | 1 | X | X | 0 | X | 0 | 1 | X | X | (7) |
| 1 | X | 0 | 0 | X | 0 | 1 | X | 0 | X | (8) |
| 1 | 0 | X | 0 | X | 0 | 1 | X | X | 1 | (9) |

(1), (4), (7) ARE MERGIBLE
(2), (5), (8) ARE MERGIBLE
(3), (6), (9) ARE MERGIBLE (b)

| 0 | 1 | X | 1 | 0 | 1 | 0 | 1 | 0 | X | (1) + (4) + (7) |
| 1 | X | 0 | 0 | 0 | 0 | 1 | 1 | 0 | 1 | (2) + (5) + (8) |
| 1 | 0 | X | 0 | X | 0 | 1 | X | X | 1 | (3) + (6) + (9) |

PATTERN LENGTH IDENTICAL WITH PATTERN LENGTH PRIOR TO COMPRESSION (c)

| 0 | 1 | X | 1 | 0 | 1 | 0 | 1 | 0 | X | (1) + (4) + (7) |
| 1 | 0 | 0 | 0 | 0 | 0 | 1 | 1 | 0 | 1 | (2) + (3) + (5) + (6) + (8) + (9) |

PATTERN LENGTH SMALLER THAN THAT PRIOR TO COMPRESSION

FIG. 5

(a) PATTERNS BEFORE COMPRESSION

| 0 | 1 | 1 | 1 | 0 | 1 | 0 | 1 | 0 | 0 |
|---|---|---|---|---|---|---|---|---|---|
| 1 | X | 0 | 0 | 0 | 0 | 1 | 1 | 0 | 1 |
| 1 | 0 | 1 | 0 | 1 | 0 | 1 | X | 1 | 1 |

→ REMOTE CPU #1 — FAULT SIMULATION AND ASSIGNMENT OF UNDEFINED VALUES →

TEST PATTERN #1

| 0 | 1 | X | 1 | X | X | X | X | 0 | X | (1) |
| X | X | 0 | X | 0 | 0 | 1 | 1 | 0 | 1 | (2) |
| 1 | X | X | 0 | X | 0 | 1 | X | X | 1 | (3) |

→ REMOTE CPU #2 — FAULT SIMULATION AND ASSIGNMENT OF UNDEFINED VALUES →

TEST PATTERN #2

| 0 | X | X | X | 0 | 1 | 0 | 1 | 0 | X | (4) |
| 1 | X | X | 0 | 0 | 0 | 1 | 1 | X | 1 | (5) |
| X | 0 | X | 0 | X | X | X | X | X | 1 | (6) |

→ REMOTE CPU #3 — FAULT SIMULATION AND ASSIGNMENT OF UNDEFINED VALUES →

TEST PATTERN #3

| X | 1 | X | X | 0 | X | 0 | 1 | X | X | (7) |
| 1 | X | 0 | 0 | X | 0 | 1 | X | 0 | X | (8) |
| 1 | 0 | X | 0 | X | 0 | 1 | X | X | 1 | (9) |

(b)

| 0 | 1 | 0 | 1 | 0 | 0 | 1 | 1 | 0 | 1 | (1+2) |
| 1 | X | X | 0 | X | 0 | 1 | X | X | 1 | (3) |
| 0 | 0 | X | 0 | 0 | 1 | 0 | 1 | 0 | 1 | (4+6) |
| 1 | X | X | 0 | 0 | 0 | 1 | 1 | X | 1 | (5) |
| X | 1 | X | X | 0 | X | 0 | 1 | X | X | (7) |
| 1 | 0 | 0 | 0 | 0 | 0 | 1 | X | 0 | 1 | (8+9) |

(c)

| 0 | 1 | 0 | 1 | 0 | 0 | 1 | 1 | 0 | 1 | (1+2) |
| 1 | 0 | 0 | 0 | 0 | 0 | 1 | 1 | 0 | 1 | (3+5+8+9) |
| 0 | 0 | X | 0 | 0 | 1 | 0 | 1 | 0 | 1 | (4+6) |
| X | 1 | X | X | 0 | X | 0 | 1 | X | X | (7) |

NO FURTHER MERGING IS POSSIBLE AND PATTERN LENGTH EXCEEDS THAT PRIOR TO COMPRESSION

ASSIGN UNDEFINED VALUES

FIG.12

| INPUT PINS | a. | b. | c. | d. | e. | f. | g. | h. |
|---|---|---|---|---|---|---|---|---|
| PATTERN 1 | X | 1 | 0 | X | X | 0 | X | 1 |
| PATTERN 2 | X | X | 0 | 1 | X | X | 0 | 1 |
| PATTERNS AFTER MERGING | X | 1 | 0 | 1 | X | 0 | 0 | 1 |

TEST PATTERN COMPRESSION METHOD, APPARATUS, SYSTEM AND STORAGE MEDIUM

FIELD OF THE INVENTION

This invention relates to a technique for generating test patterns for logic circuits and, more particularly, to a method and apparatus for compressing test patterns which detect faults in logic circuits.

BACKGROUND OF THE INVENTION

Increases in the scale of large-scale integration generally is accompanied by use of a method wherein a test pattern generating process which generates test patterns for detecting faults in logic circuits such as logical LSI devices is provided with a pattern compression processing step for reducing the pattern length of the test patterns, without lowering the fault detection rate of the test patterns, before the generated test patterns are supplied to the LSI tester. According to this method, it is the test patterns compressed by the pattern compression step that are supplied to the LSI tester. The reason for adopting this method is that higher integration and functionality of LSI devices is associated with test patterns of larger scale, making it necessary to compress the test patterns in advance in order to raise testing efficiency so as to overcome limitations on test-pattern memory (local memory) with which the LSI tester is equipped.

Conventionally, test pattern compression is carried out by assigning an undefined value (also referred to as an "indeterminate value") X (Don't Care), which will not lower fault detection performance, to the fault-detection test patterns and trying pattern merging in accordance with prescribed rules on a plurality of test patterns to which the undefined value X has been assigned. A known method of assigning the undefined value X to fault detection test patterns is to assign the undefined value X to input pins that do not participate in fault detection, e.g., input pins that do not possess paths to an output pin at which a fault has been detected.

A test pattern comprises rows and columns, and the number of a row starting from the first row is referred to as the "pattern number". The columns correspond to the pins of the logic circuit. The pattern of the first row is applied simultaneously to the input pins of the device (logic circuit) undergoing testing in the LSI tester. This pattern is referred to also as a "test vector". The pattern applied to the input pins of the device being tested is treated as a test pattern.

A fault model of a logic circuit and assignment of the undefined value X to test patterns will be described below. The fault dealt with in a logic-circuit fault simulation is a modeled logical fault. The model usually used is a simple degenerate fault model. The simple degenerate fault model has such a fault that the output of a gate circuit, for example, is always fixed at 0 (a 0 degeneracy fault, or "stuck at 0") or at 1 (a 1 degeneracy fault, or "stuck at 1") regardless of the input to the gate circuit.

Faults in a logic circuit will be discussed in general taking as an example a combinational circuit illustrated in FIG. 10A. This combinational circuit. is such that when the output of an OR gate OR2 has developed a 1 degeneracy fault (stuck at 1) Sa1, the output of this OR gate is always "1" and never "0" even when the input side thereof is supplied with a pattern that should make the output "0". Accordingly, with regard to a pattern for detecting the fact that the output of the OR gate OR2 is stuck at 1, it is necessary to detect that the OR gate OR2 outputs "1" when "0" is applied to both inputs of the OR gate OR2. To achieve this, it is required to make (0, 0) the two inputs to the OR gate OR2 and to make "1" the output of an OR gate OR3 whose output is connected to one input terminal of an AND gate AND6 the other input terminal of which has the output of OR gate OR2 connected thereto. It will suffice to make (0, 0) the two inputs to an OR gate OR1, which will output "0", and to make "0" one of the two inputs to the AND gate AND3. For this it will suffice to make "0" one of the two inputs of each of AND gates AND1, AND2 whose output terminals are connected to the input side of the OR gate OR1. Further, it will suffice to make "1" one of the two inputs to the OR gate OR3. If the output of an AND gate AND4 has been made "1", then it will suffice to make "1" both inputs to the AND gate AND4 and to make "0" or "1" the output of an AND gate AND5.

In order to compress test patterns for detecting faults in a logic circuit, the undefined value X is assigned to input pins for which it does not matter whether the assigned values are "0" or "1". In a case where an undefined value X in a test pattern is input to an LSI tester, the value is set to "0" or "1".

In order to detect the Sa1 fault at the output of the OR gate OR2, the test pattern applied to input pins I1–I10 of the logic circuit is made "0100101101", as shown in FIG. 10A. However, since the input pins I2, I3, I9 and I10 play no part in fault detection, undefined values X are assigned to these pins. As a result, the generated test pattern will be "0XX0X011XX". The test pattern with the assigned undefined values X is merged with other test patterns in the row direction in accordance with a predetermined rule, whereby compression is achieved. Processing for achieving pattern merging will be described in detail later.

Another method of compressing a test pattern known in the art is to switch the order of test patterns.

DISCUSSION ON THE RELATED ART

The configuration and operation of a system used in compressing test patterns according to the related art will now be described.

FIG. 8 illustrates a system configuration according to a related art. In an information processor (referred to as a "local CPU") 10A which executes pattern compression processing, circuit information 301 concerning a logic circuit to be tested is read into the system by circuit information read-in means 304, fault information 302 is read into the system by fault information read-in means 305, a test pattern (pattern information) 303 is read into the system by pattern information read-in means 306 and a repeated random-number fault simulation is run for all faults. The test pattern 303 to be compressed is created automatically by ATPG (Automatic Test Pattern Generation), semi-automatically or manually. If the information composed of the circuit information 301, fault information 302 and pattern information 303 has been stored in a file unit, then the read-in means 304, 305, 306 constitute input means for inputting the information from the file unit. On the other hand, if the information composed of the circuit information 301, fault information 302 and pattern information 303 resides in a server or the like (not shown) connected to a network, then the read-in means 304, 305, 306 constitute communication means for downloading the circuit information 301, fault information 302 and pattern information 303 from the server.

The fault information 302 comprises a list of paired information, namely faults and fault insertion points (node information) in logic circuit. As mentioned earlier, the fault dealt with in the fault simulation is the logical fault Sa0 (stuck at 0) or Sa1 (stuck at 1).

A random-number fault simulation assigns "0" or "1" to undefined values in a test pattern-using random numbers, thereby activating the undefined values to carry out the fault simulation.

More specifically, in order to perform pattern compression by pattern merging, undefined values X are inserted into the test pattern, which has been read into the system by the pattern-information read-in means 306, at locations that are not necessary for fault detection, as described earlier.

By assigning "0" or "1" to the undefined values X in this test pattern, the undefined values are activated to remove them from within the logic circuit undergoing inspection. Using pseudo-random numbers generated based upon random-number-sequence initial-value information 308 set by random-number-sequence initial-value setting means 307, means 309 for generating random numbers and assigning them to undefined values assigns a sequence of "0"s or "1"s, in which the probability of occurrence thereof is random, to the undefined values X in succession, thereby generating test patterns 310 in which the undefined values X have been activated. By thus activating the undefined values X using random numbers, the possibility of fault detection is increased.

Using the test patterns 310 in which the undefined values have been activated using pseudo-random numbers and the circuit information and fault information that has been read in, fault simulation means 311 executes fault simulation.

The fault simulation means 311 sets a fault, which has been stipulated in the fault information 302, at a node of the logic circuit, applies the test patterns as an input and subjects the logic circuit to a logical simulation by a logic simulator to obtain an output pattern. Then, without inserting the fault, the simulation means applies the test patterns as the input and subjects the logic circuit to a logical simulation by the logic simulator to obtain the output pattern. It is assumed that a fault has been detected when the two output patterns do not match.

On the basis of the result of fault detection output from the fault simulation means 311, test patterns in which the undefined values have been activated are checked for fault detection capability on a per-pattern-number basis and patterns of pattern numbers that do not detect the fault are discarded. In addition, even pattern numbers of patterns that detect the fault have undefined values X assigned by undefined-value assigning means 312 to pins that do not participate in the fault detection, whereby test patterns (pattern information) 313 are created.

Test patterns output from the undefined-value assigning means 312 are merged by pattern merging means 315. If predetermined conditions are satisfied, pattern output means 316 outputs the merged test patterns as output pattern information 317.

Fault-detection-status list output means 318 outputs information 319, which represents the status of output fault detection, from fault-detection status information 314 to a file or output unit.

FIG. 9 is a flowchart useful in describing pattern compression processing in a system of the related art, and FIG. 11 is a schematic view useful in describing pattern compression using a repeated random-number fault simulation. Pattern compression processing in the system of the related art will be described with reference to FIGS. 9 and 11.

Circuit information, fault information and test patterns are read in (steps S21–S23).

Test patterns for detecting a list of faults f1–f8 [see (a) of FIG. 11] that have been defined for the particular logic circuit are created, a pattern (referred to as "Pattern 1") of Pattern No. 1 detects faults f1, f2, f3, a pattern (referred to as "Pattern 2") of Pattern No. 2 detects faults f4, f5, f6, and a pattern (referred to as "Pattern 3") of Pattern No. 3 detects faults f7 and f8 [see (b) of FIG. 11].

Next, after initial values of the random-number sequence are set, "0" or "1" is assigned to the undefined values X using pseudo-random numbers (steps S24 and S25 in FIG. 9). One method of assignment is to assign "0" or "1" depending upon whether the value of a function which generates pseudo-random numbers having numerical values between 0.0 and 1.0 is less than 0.5 or equal to or greater than 0.5. Setting initial values of a random-number sequence involves setting initial values used in the computation of the pseudo-random numbers in the function for generating the pseudo-random numbers. The function (implemented by the processor of the local CPU) for generating the pseudo-random numbers generates a random-number sequence ($R_1$, $R_2$, . . . $R_m$, . . . ) successively by executing an arithmetic operation based upon a prescribed recursion formula $R_{n+1}=f(R_n)$ in which a given initial value serves as the first random number R0 (referred to as a "seed random number").

By way of example, the undefined values X in columns 9, 10, 13, 14 of Pattern 1 among the Patterns 1–3 in (b) of FIG. 11 become the object of activation by assignment of "0" or "1" based upon the first to fourth random numbers ($R_1$–$R_4$) of the pseudo-random number sequence; the undefined values X in columns 4, 6, 10, 13, 14 of Pattern 2 become the object of activation by assignment of "0" or "1" based upon the fifth to ninth random numbers ($R_5$–$R_9$), and the undefined values X in columns 3, 4, 6, 8, 10, 12, 14 of Pattern 3 become the object of activation by assignment of "0" or "1" based upon the tenth to sixteenth random numbers ($R_{10}$–$R_{16}$) As a result, Patterns 1–3 of the kind shown in (c) of FIG. 11, for example, are obtained as test patterns to which "0" or "1" has been assigned (i. e., test patterns whose undefined values have been activated) based upon the above-mentioned sequence of pseudo-random numbers.

With reference again to FIG. 9, fault simulation is carried out (step S26) using the test patterns whose undefined values X have been activated by "0" or "1".

As a result of the fault simulation in the example shown at (d) of FIG. 11, faults f1–f4, f5, f8 are detected using Pattern 1, faults f5, f6, f7 are detected using Pattern 2 and no faults can be detected using Pattern 3.

As a result, Pattern 3 which does not detect any faults is discarded, as shown at (e) of FIG. 11, whereby compression to the two pattern lengths of Patterns 1 and 2 is achieved, and undefined values are assigned to pins not related to fault detection in each of the two remaining patterns.

Discarding Pattern 3 is equivalent to saying that none of the pins of Pattern 3 participate in fault detection. Undefined values X are assigned to all pins of Pattern 3, and the pattern having the undefined values X assigned to all pins is merged with any other pattern by the pattern merging means 315. Essentially, therefore, this corresponds to eliminating the pattern. In other words, rather than eliminating Pattern 3 at the stage of (e) in FIG. 11, a pattern "XXXXXXXXXXXXXXXX" in which the values of all columns of Pattern 3 have been made undefined values X may be generated at step (f) in FIG. 11.

The test patterns created are then merged by the pattern merging means 315 (step S27 in FIG. 9).

Next, it is determined whether the test pattern obtained by pattern merging satisfies a predetermined final condition (step S28 in FIG. 9). If the final condition is not satisfied, processing is repeated from the setting of the initial values of the random-number sequence at step S24 in FIG. 9. If the final condition is satisfied, however, output-pattern information is output from the pattern output means 316 (step 29 in FIG. 9). A case where the fault detection rate has attained a preset target fault detection rate is used as the final condition, by way of example. Alternatively, a case where the pattern compression rate has attained a preset fixed value or a case where the number of repetitions has exceeded a predetermined number may serve as the final condition.

The details of processing executed by the pattern merging means 315 will be described next. In a case where a certain pin (column) of two patterns has the same value in the patterns or at least one of the values is an undefined value X, the two values are said to be "mergible". In a case where the values of all pins (columns) in the two patterns are mergible, then these two patterns are said to be mergible. Two patterns which do not satisfy this condition are said to be "non-mergible".

If a column of the two patterns has identical values, this value appears in the corresponding column of the pattern resulting from merging, and if a column of the two patterns has one undefined value, the value other than the undefined value appears in the corresponding column of the pattern resulting from merging.

Pattern merging will be described in detail using the example shown in FIG. 12. As shown in FIG. 12, the pattern of Pattern 1 is "X10XX0X1" and the pattern of Pattern 2 is "XX01X001". In Patterns 1 and 2, the columns corresponding to input pins a and e have undefined values X for both patterns; the columns corresponding to input pins c and h have "0"s and "1"s, respectively, for both patterns; and the columns corresponding to input pins b, d, f and g have an undefined value X for one pattern and either "0" or "1" for the other pattern. Since all pins a–h are thus mergible, the two patterns are merged into a single pattern. The pattern obtained by such merging is a compressed pattern "X101X001".

The pattern merging means 315 tries pattern merging for combinations of all pattern numbers among the test patterns.

Though not illustrated in FIG. 8, the order of test patterns may be reversed. This is to perform a fault simulation by rearranging the pattern numbers in reverse order. Test patterns are compressed by specifying patterns that are not necessary for fault detection and discarding these patterns. For a description of a reversing fault simulation method, refer to "SOCRATES: A Highly Efficient Automatic Test Pattern Generation System", IEEE. Trans. On CAD., pp. 126–137, January 1988). Thus, in a case which includes a step of reversing the order of the test patterns, assignment of "0" or "1" to undefined values of a test pattern using random numbers, fault simulation, assignment of undefined values to a test pattern, pattern merging and reversal of the pattern order are repeated until the prescribed final condition is satisfied in accordance with the processing procedure described above.

It should be noted that means for assigning undefined values to test patterns and means for pattern merging are described in the specification of Japanese Patent Application Laid-Open JP-A-8-212799, by way of example.

SUMMARY OF THE DISCLOSURE

The methods of the related art described above are disadvantageous in that pattern compression requires an extended period of time for processing. The reason for this is that the series of processes for achieving pattern compression by assigning "0" or "1" as undefined values in test patterns using random numbers, performing fault simulation, assigning undefined values to test patterns and merging patterns is executed in a single information processor.

Fault simulation involves comparing the results of simulation applied to a normal logic circuit and the results of simulation applied to a logic circuit into which faults have been introduced. A consequence of this approach is that an increase in the scale of logic circuits to be inspected and in the number of faults defined for logic circuits is accompanied by an increase in the processing time needed for fault analysis. In other words, when a series of processes for pattern compression is executed by a single information processor, an enormous amount of computation is required for a large-scale integrated circuit and this leads to longer processing time.

Further, there is a preceding Japanese Patent Application No. 11-139144 (undisclosed at the time of filing of the present application) assigned to NEC IC Microcomputer Systems, Ltd., a subsidiary of the assignee of the present invention describes a method which includes the steps of assigning either the state "0" or "1" to test patterns; discarding test patterns which cannot detect faults in a logic circuit from among test patterns in which "0" or "1" has been assigned to undefined values and changing locations in a test pattern that are unnecessary for detecting faults to undefined values; merging test patterns among the undiscarded remaining test patterns that are capable of being merged in accordance with a predetermined rule; and changing the order of a plurality of test patterns contained in a set of test patterns The entire disclosure of the Japanese Patent Application No. 11-139144 is herein incorporated by reference thereto. However, there is still much desired also for the method of this preceding application.

Accordingly, an object of the present invention is to provide a method, system and apparatus, as well as a program product and a medium carrying the applicable programs, for speeding up pattern compression by repeated random-number fault simulation and for improving compression efficiency.

According to a first aspect of the present invention, there is provided a test pattern compression method of executing the following steps in distributed fashion by a plurality of processing units:

(a) a repeated random-number fault simulation step which includes:

(a1) creating test patterns in which undefined values in test patterns that inspect a logic circuit for faults defined for the logic circuit have been activated by assigning "0" or "1" to these undefined values based upon a random-number sequence;

(a2) running a fault simulation on the logic circuit using fault information and the test patterns in which the undefined values have been activated; and, (a3) generating and outputting, on the basis of results of the fault simulation, test patterns having undefined values assigned to values for pins that do not participate in fault detection in the test patterns in which the undefined values have been activated; and (b) pattern merging the test patterns generated and output by the repeated random-number fault simulation step (a);

wherein (c) the faults defined for the logic circuit are divided into a plurality of fault groups (in conformity with the number of the plurality of processing units), the fault groups are assigned to respective ones of the plurality of processing units, and (d) the plurality of processing units execute the repeated random-number-fault simulation step for the logic circuit independently of one another using the fault groups that have been assigned to respective ones of the processing units.

In a second aspect of the present invention, the initial values of the random numbers are used in common by the plurality of processing units that run the random-number fault simulation step, whereby test patterns before compression by the repeated random-number fault simulations performed by the plurality of processing units are made the same. This holds down an increase in test pattern length.

In a third aspect of the present invention, when test patterns generated as a result of running the repeated random-number fault simulation step by the plurality of processing units are subjected to pattern merging, pattern length is maintained the same as that of the test patterns before compression by merging those test patterns, which have been generated by different processing units, that have identical pattern numbers, after which test patterns having different pattern numbers are subjected to pattern merging, thereby reducing length of the test patterns.

According to a fourth aspect of the present invention, there is provided a test pattern compression apparatus. The apparatus comprises: one processing unit and 1st to Nth (where N is a positive integer equal to or greater than 2) processing units connected to the one processing unit, configured for compressing and outputting test patterns, wherein the one processing unit has fault dividing means for dividing faults defined for a logic circuit to be inspected into a plurality of fault groups and assigning the fault groups to the 1st to Nth processing units, the one processing unit supplying the fault groups to respective ones of the corresponding 1st to Nth processing units and supplying circuit information relating to the logic circuit, test patterns to undergo compression processing and initial-value information of a random-number sequence to the 1st to Nth processing units.

(a) The 1st to Nth processing units each have:
(a1) means for generating test patterns in which undefined values in the test patterns have been activated by assigning "0" or "1" to these undefined values based upon a random-number sequence that has been generated from the initial-value information of the random-number sequence;
(a2) means for inserting the divided faults into the logic circuit and running a fault simulation using the test patterns in which the undefined values have been activated; and
(a3) undefined-value assignment means for checking fault detection performance of the test patterns in which the undefined values have been activated, on the basis of fault-detection result information obtained by the fault simulation, and generating test patterns having undefined values assigned to input pins that do not participate in fault detection of the logic circuit in the test patterns in which the undefined values have been activated.

(b) The one processing unit further has pattern merging means for acquiring pluralities of test patterns that have been generated by the undefined-value assignment means of respective ones of the 1st to Nth processing units, generating first test patterns obtained by merging those test patterns, which have been generated by different processing units, that have identical pattern numbers among the pluralities of test patterns, and then attempting merging among the generated first test patterns, which have different pattern numbers from one another.

According to a fifth aspect of the present invention, there is provided a program product for operating a test pattern compression apparatus, which comprises one processing unit and 1st to Nth (where N is a positive integer equal to or greater than 2) processing units connected to the one processing unit, for compressing and outputting test patterns. The program product has a program for causing the one processing unit to execute the following steps (a) to (c): (a) a dividing step of dividing faults defined for a logic circuit to be inspected into a plurality of fault groups and assigning the fault groups to the 1st to Nth processing units, (b) a step of supplying the divided fault groups to respective ones of the 1st to Nth processing units and for supplying circuit information relating to the logic circuit, test patterns to undergo compression processing and initial-value information relating to generation of a random-number sequence to the 1st to Nth processing units, and (c) a step of acquiring Pluralities of test patterns that have been generated by respective ones of the 1st to Nth processing units, generating first test patterns obtained by merging those test patterns, which have been generated by different processing units, that have identical pattern numbers among said pluralities of test patterns, and then attempting pattern merging among the generated first test patterns, which have different pattern numbers from one another.

And the program product further has a program for causing each of the 1st to Nth processing units to execute the following steps (d) to (f): (d) a step of generating test patterns in which undefined values in the test patterns transmitted from the one processing unit have been activated by generating a pseudo-random-number sequence from the initial-value information relating to the generation of the random-number sequence and assigning "0" or "1" to the undefined values, (e) a step of inserting the divided faults into the logic circuit and running a fault simulation using the test patterns in which the undefined values have been activated, and (f) a step of checking fault detection performance of the test patterns in which the undefined values have been activated, on the basis of fault-detection result information obtained by the fault simulation, and generating test patterns having undefined values assigned to values of input pins of said logic circuit that do not participate in fault detection of said logic circuit in the test patterns in which the undefined values have been activated.

Other features and advantages of the present invention will be apparent from the following description and appended claims taken in conjunction with the accompanying drawings, in which like reference characters designate the same or similar parts throughout the figures thereof.

BRIEF DESCRIPTION OF THE DRAWINGS

FIG. 4 is a schematic view useful in describing pattern merging according to this embodiment;

FIG. 5 is a schematic useful in describing a comparative example of pattern merging;

FIG. 12 is a diagram useful in describing pattern merging.

DESCRIPTION OF THE PREFERRED EMBODIMENTS

Figure 1:
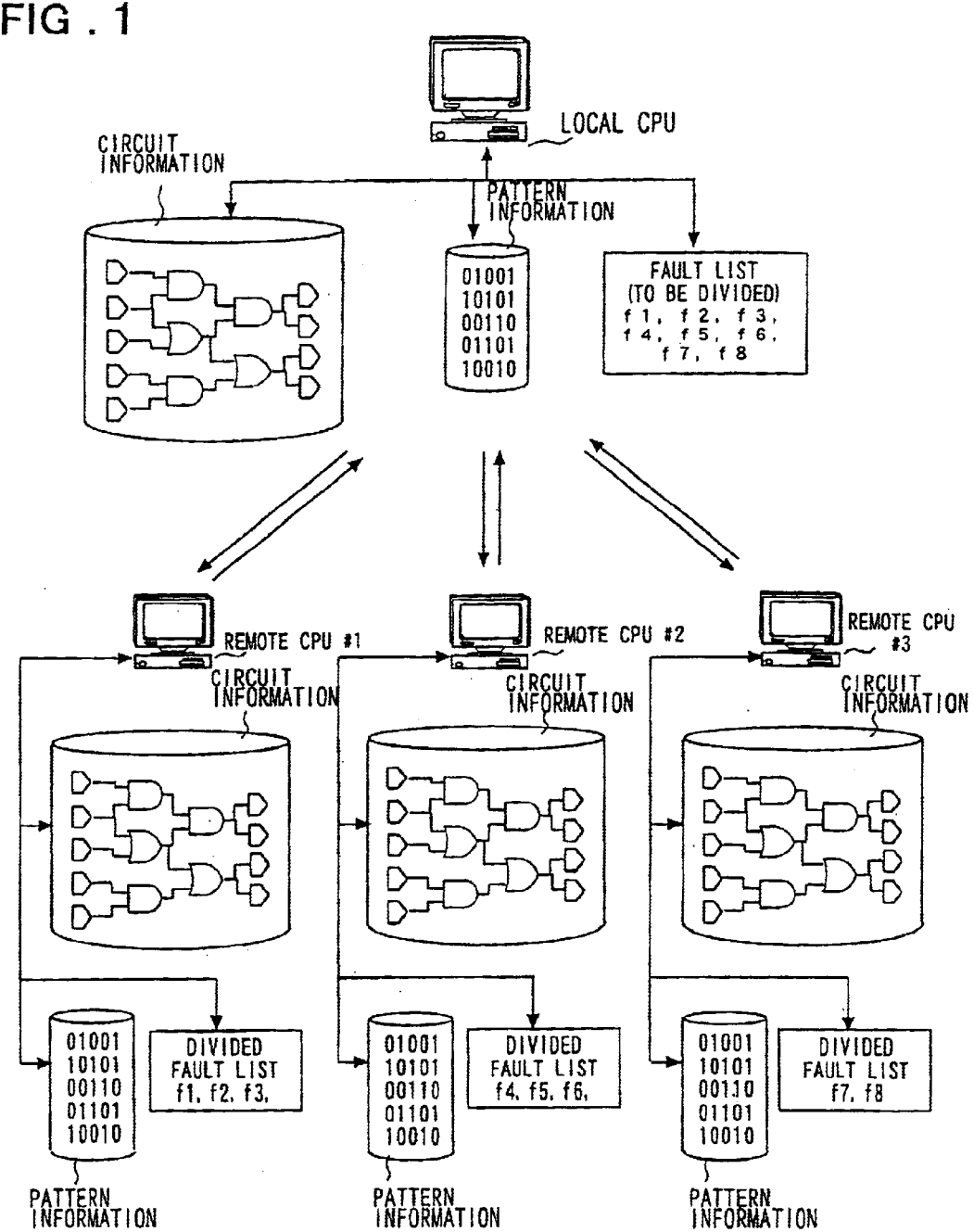
FIG. 1 is a schematic view useful in describing a system according to an embodiment of the present invention.

A preferred mode for practicing the present invention will now be described.

In a preferred mode for practicing the present invention, a test pattern compression system is made up by a distributed processing system having one processing unit 10 and 1st to Nth (where N is a positive integer equal to or greater than 2) processing units $20_1$ to $20_N$ connected to the one processing unit 10.

The processing unit 10 divides faults, which are inserted into a logic-circuit fault simulation, into a plurality of fault groups, assigns the divided faults to the 1st to Nth processing units $20_1$ to $20_N$ and supplies them to the corresponding 1st to Nth processing units $20_1$ to $20_N$. The processing unit 10 further supplies circuit information concerning the logic circuit, test patterns that are to undergo compression processing and initial-value information concerning generation of a random-number sequence to the 1st to Nth processing units $20_1$ to $20_N$.

Each of the 1st to Nth processing units $20_1$ to $20_N$ generates test patterns in which undefined values in the above-mentioned test patterns have been activated by generating a pseudo-random-number sequence from the initial-value information concerning the generation of the random-number sequence and assigning "0" or "1" to the undefined values. When means 201 in each of the 1st to Nth processing units $20_1$ to $20_N$ for generating random numbers and assigning them to the undefined values produces a pseudo-random-number sequence from common initial-value information by common arithmetic processing, test patterns obtained by generating a common pseudo-random-number sequence in each of the 1st to Nth processing units $20_1$ to $20_N$ and successively assigning "0" or "1" to the undefined values of these test patterns based upon the values of the random numbers will have identical content throughout the 1st to Nth processing units $20_1$ to $20_N$.

Next, each of the 1st to Nth processing units $20_1$ to $20_N$ inserts the divided faults into the logic circuit and runs a fault simulation on the logic circuit using the test patterns in which the undefined values have been activated.

Next, each of the 1st to Nth processing units $20_1$ to $20_N$ checks the fault detection performance of the test patterns, in which the undefined values have been activated, on the basis of fault-detection result information obtained by running of the fault simulation, deletes the pattern numbers of test patterns that do not detect faults, and, with regard to test patterns of pattern numbers (rows) which detect faults, generates test patterns in which undefined values have been assigned to columns corresponding to input pins that do not participate in fault detection of the logic circuit in the test patterns in which the undefined values have been activated.

With regard to pluralities of test patterns acquired from respective ones of the 1st to Nth processing units $20_1$ to $20_N$, the one processing unit 10 attempts to merge test patterns having different pattern numbers among test patterns first generated by merging those test patterns, which have been generated by different processing units and have identical pattern numbers. The one processing unit 10 then determines whether the test patterns obtained by pattern merging satisfy predetermined final conditions. If the final conditions (for termination) are not satisfied, the processing unit 10 supplies the test patterns and the initial-value information of the random number to each of the 1st to Nth processing units $20_1$ to $20_N$, the 1st to Nth processing units $20_1$ to $20_N$ again activate undefined values, run the fault simulation and execute processing for assigning undefined values, and the processing unit 10 subjects the pluralities of test patterns acquired from the 1st to Nth processing units $20_1$ to $20_N$ to pattern merging. If the predetermined final conditions are satisfied, on the other hand, the processing unit 10 outputs pattern information.

In accordance with this mode of practicing the present invention, pattern compression is performed in distributed fashion simultaneously and in parallel by the plurality of processing units. The time required for pattern compression, therefore, can be shortened significantly.

Further, the initial values of the random numbers that are for generating the test patterns in which the undefined values have been activated are shared by the plurality of processing units that execute the random-number fault simulation, the merging of test patterns of identical pattern numbers among the test patterns created by different processing units is performed first, then the merging of patterns having different pattern numbers is performed. As a result, there is no increase in pattern length by distributed processing.

In the present invention, the processing unit 10 implements the following steps (a) through (c) by executing a first program:

(a) a dividing step of dividing faults defined for a logic circuit to be inspected into a plurality of fault groups and assigning the fault groups to respective ones of the 1st to Nth processing units;

(b) a step of supplying the 1st to Nth processing units with the divided fault groups, circuit information concerning the logic circuit and test patterns to undergo compression processing, and for supplying the 1st to Nth processing units with initial-value information concerning generation of a random-number sequence; and (c) a step of acquiring pluralities of test patterns that have been generated by respective ones of the 1st to Nth processing units, generating first test patterns obtained by merging test patterns that have identical pattern numbers, and then attempting merging of test patterns among the generated first test patterns.

Further, each of the 1st to Nth processing units $20_1$–$20_N$ implements the following steps (d) through (f) by executing a second program:

(d) a step of generating test patterns in which undefined values in the above-mentioned test patterns have been activated by generating a pseudo-random-number sequence from the initial-value information concerning the generation of the random-number sequence and assigning "0" or "1" to the undefined values;

(e) a step of inserting the divided faults into the logic circuit and running a fault simulation using the test patterns in which the undefined values have been activated; and (f) a step of generating test patterns in which undefined values have been assigned to input pins that do not participate in fault detection of the logic circuit in the test patterns in which the undefined values have been activated on the basis of fault-detection result information obtained by running of the fault simulation.

A program product is made up of the first and second programs.

In this case, the present invention can be implemented by reading these programs into the processing units 10, $20_1$–$20_N$ from a recording medium on which the programs have been recorded, installing the programs and then executing them.

A preferred embodiment of the present invention will now be described in greater detail with reference to the drawings, in which FIG. 1 is a view schematically illustrating the configuration of the system according to this embodiment. FIG. 1 illustrates the overall configuration of the system, in which the compression of test patterns is performed by distributed processing executed by a plurality of CPUs.

As shown in FIG. 1, a local CPU 10 and multiple remote CPUs $20_1$–$20_3$ are connected to each other via a network, which is not shown. The local CPU 10 and remote CPUs $20_1$–$20_3$ may be constructed as information processing units such as work stations, and a well-known network such as a LAN (Local-Area Network) may be used as the network. Alternatively, the local CPU 10 and remote CPUs $20_1$–$20_3$ may be implemented as a plurality of processor elements of a multiprocessor connected to a common bus for executing distributed processing. Further, it goes without saying that the number of remote CPUs is not limited to three.

As shown in FIG. 1, the local CPU 10 divides a list of faults (f1–f8) into groups the number of which corresponds to the number of remote CPUs. Logic-circuit information and test patterns (pattern information) retained by the local CPU 10 are transmitted to the remote CPUs $20_1$–$20_3$ as is, and the groups obtained by dividing the faults are transmitted to the corresponding remote CPUs $20_1$–$20_3$. In FIG. 1, the list of divided faults f1–f3, the list of divided faults f4–f6 and the list of divided faults f7, f8 are transmitted to the remote CPUs 201, 202 and 203, respectively.

Each of the remote CPUs $20_1$–$20_3$ executes a repeated random-number fault simulation comprising a process for assigning "0" or "1", which is based upon random numbers (or random number sequence), to undefined values X in the test patterns that have been transmitted from the local CPU 10, thereby activating the undefined values; a process for executing a fault simulation based upon the list of faults, the circuit information and the test patterns; and processing for assigning undefined values to pins that do not take part in fault detection in the test patterns. On the basis of the result of the simulation, each of the remote CPUs $20_1$–$20_3$ sends the test patterns to which the undefined values have been assigned back to the local CPU 10.

Figure 2:
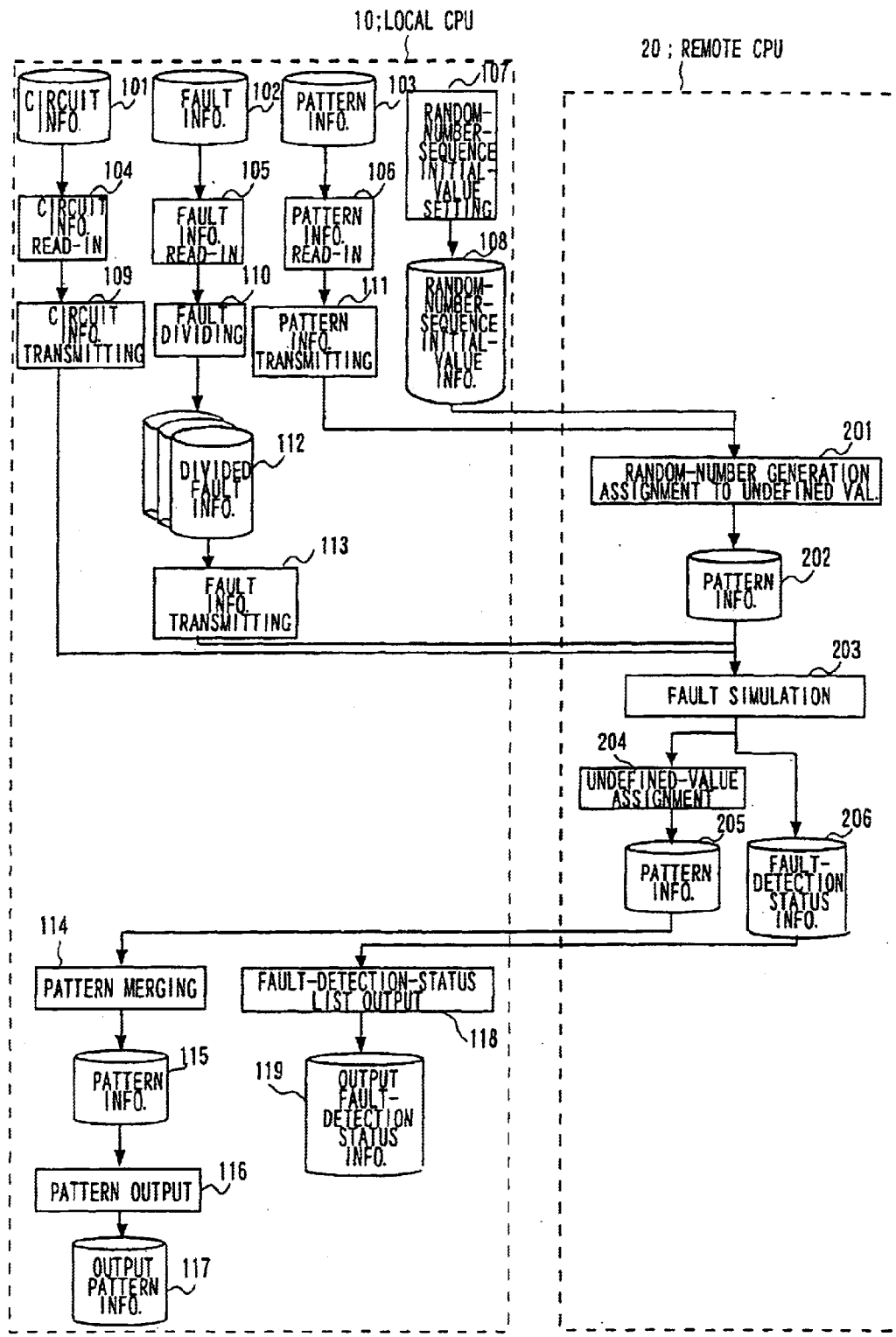
FIG. 2 is a diagram illustrating the configuration of the system according to this embodiment.

FIG. 2 illustrates the details of the system configuration according to this embodiment. It should be noted that the remote CPUs $20_1$–$20_3$ all are similarly constructed of the same basic elements and that only one remote CPU indicated at numeral 20 is illustrated in FIG. 2.

As shown in FIG. 2, the local CPU 10 includes circuit information read-in means-104 from which circuit information 101 relating to the logic circuit to be inspected is read into the apparatus, fault information read-in means 105 from which fault information 102 is read into the apparatus, and pattern information read-in means 106 from which test patterns (pattern information) 103 that are to be compressed are read into the apparatus.

The circuit information that has been read in from the circuit information read-in means 104 is transmitted to the remote CPU 20 via circuit information transmitting means 109.

The pattern information that has been read in from the pattern information read-in means 106 is transmitted to the remote CPU 20 via pattern information transmitting means 111.

The fault information that has been read in from the fault information read-in means 105 is divided into a plurality of groups, the number of which corresponds to the number of remote CPUs 20, by fault dividing means 110, and each group is output as divided fault information 112. The fault information 112 divided into these groups is transmitted, on a per-group basis, to the corresponding remote CPU 20 via fault information transmitting means 113. It should be noted that if the number of faults defined for each logic circuit is less than the number of remote CPUs 20, then the faults are assigned in suitable fashion. For example, though one method is to assign one fault to each remote CPU 20, any assignment may be made if the number of faults is small.

The local CPU 10 further transmits random-number-sequence initial-value information 108, which has been set by random-number-sequence initial-value setting means 107, to each remote CPU 20.

The remote CPU 20 has random-number generation and assignment means 201 which, on the basis of the random-number-sequence initial-value information 108 that has been received from the local CPU 10, generates random numbers for the test pattern that has been transmitted from the local CPU 10 and outputs the test pattern upon assigning "0" or "1" to the undefined values in the received pattern.

The test pattern that has been transmitted to the remote CPU 20 via the pattern information transmitting means 111 of the local CPU 10 has undefined values X inserted into locations thereof that are not necessary for fault detection. Using a pseudo-random number sequence generated based upon the random-number initial-value information 108, the means 201 of the remote CPU 20 for generating random numbers and assigning them to undefined values assigns a sequence of "0"s or "1"s, in which the probability of occurrence thereof is random, to the undefined values X in the test pattern transmitted from the local CPU 10, thereby generating test patterns in which the undefined values X have been activated. These test patterns are output as pattern information 202.

Using the test patterns 202, the undefined values of which have been activated, generated by the means 201 of the remote CPU 20 for generating random numbers and assigning them to undefined values, as we as the circuit information and fault information transmitted from the local CPU 10, fault simulation means 203 executes a fault simulation and outputs fault-detection status information 206 as a result.

On the basis of the fault-detection status information 206, test patterns (test patterns in which the undefined values have been activated) 202 of pattern numbers that do not detect faults are discarded. With regard to patterns of pattern numbers that do detect faults, undefined-value assigning means 204 assigns undefined values to the values of pins (columns) that do not participate in fault detection in these patterns, thereby generating test patterns and outputting them as pattern information 205.

The local CPU 10 accepts the pattern information 205 that has been output from the undefined-value assigning means 204 of remote CPU 20, merges the information using pattern merging means 114 and outputs the merged test patterns as pattern information 115.

If the merged test patterns satisfy predetermined final conditions (for termination), then the merged pattern information 115 is delivered as output pattern information 117 via pattern output means 116.

The local CPU 10 accepts the fault-detection status information 206 from the remote CPU 20 and outputs a list of information 119, which represents the output status of fault detection, using fault-detection-status information output means 118. It should be noted that this processing does not bear directly upon the main subject matter of the present invention and need not be described in detail.

In a case where a list of information indicating the positions of undefined values in test values and information the values assigned to these positions is transmitted directly from the local CPU 10 to the plurality of remote CPUs 20 as information relating to the assignment of "0" or "1" to the undefined values X of the test pattern, the amount of data transferred increases with an increase in the number of undefined values X that have been inserted into the test pattern. According to this embodiment of the present invention, therefore, the random-number-sequence initial-value information 108 that has been set by the random-number-sequence initial-value setting means 107 is distributed to each of the remote CPUs 20, then, on the side of each remote CPU 20, use is made of the common random-number-sequence initial-value information 108 distributed from the local CPU 10 to generate a pseudo-random-number sequence that is common among the plurality of remote CPUs 20, whereby "0" or "1" is assigned to the undefined values X in the test patterns. In other words, in this embodiment of the present invention, it suffices to transmit initial-value information for random-number sequence generation from the local CPU 10 to the plurality of remote CPUs 20, meaning that the amount of data transferred is rendered constant, i.e., made independent of the number of undefined values X that have been inserted into the test patterns.

Figure 3:
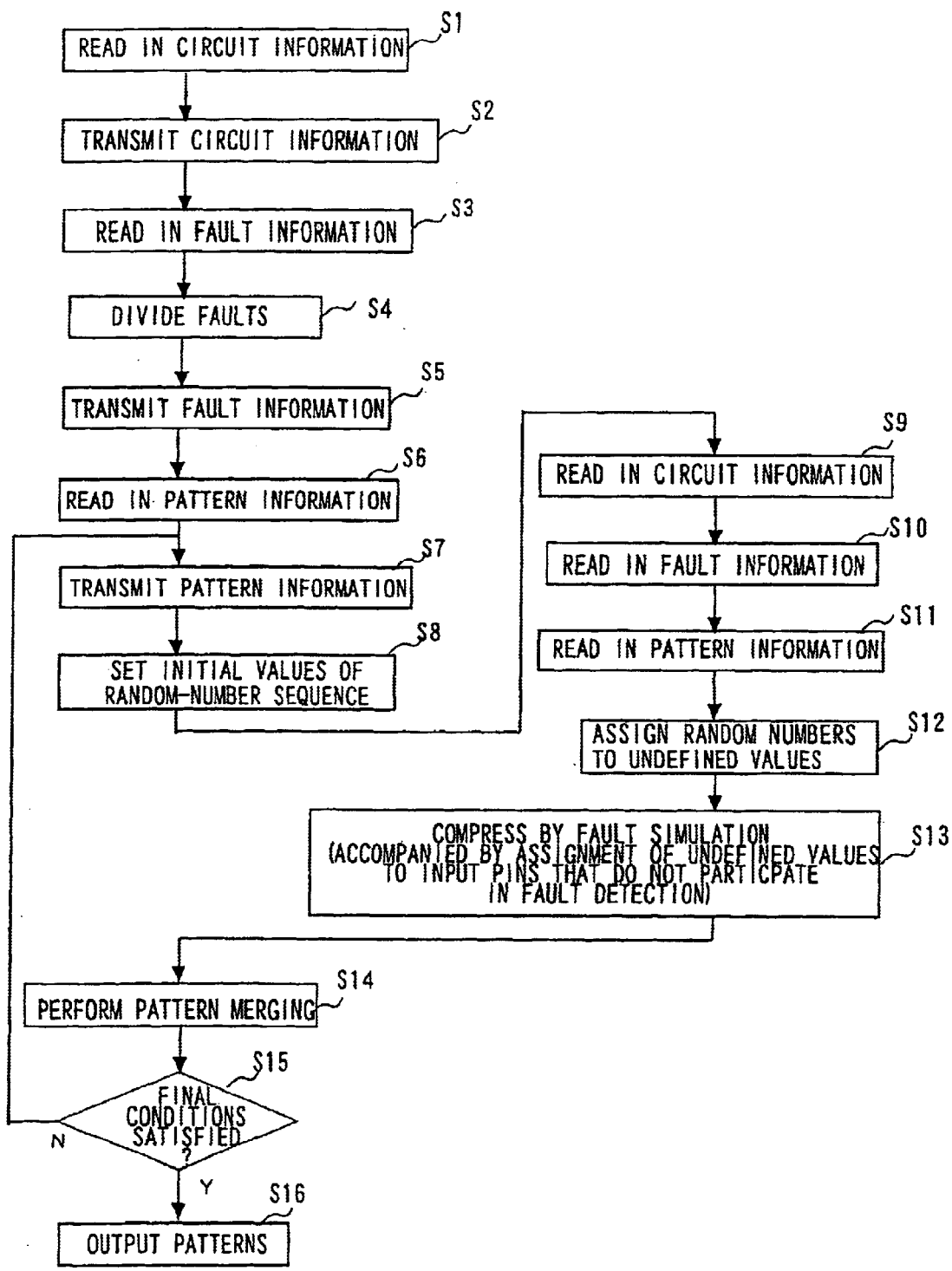
FIG. 3 is a flowchart illustrating processing according to this embodiment.

FIG. 3 is a flowchart showing processing in accordance with this embodiment of the present invention. The flow of processing in this embodiment will now be described with reference to FIGS. 2 and 3.

First, the local CPU 10 reads in the circuit information relating to the logic circuit, transmits this information to the remote CPU 20 (steps S1, S2), reads in the fault information divides this information into a plurality of, fault groups, transmits the fault information so divided to the remote CPU 20 (steps S3, S4, S5), reads in the pattern information (step S6) and transmits the pattern information to the remote CPU 20 (step S7).

The local CPU 10 sets the initial values of a random-number sequence (step S8) and transmits the initial-value information of the random-number sequence to the remote CPU 20.

The remote CPU 20 reads in the circuit information, fault information and pattern information from the storage units that store this information transmitted from the local CPU 10 (steps S9–S11), generates a pseudo-random-number sequence for the test pattern from the local CPU 10 based upon the random-number initial-value information accepted from the local CPU 10, assigns "0" or "1" to the undefined values in the patterns based upon the values of the random numbers, thereby generating a test pattern (or patterns) in which the undefined values X have been activated (step S12), and executes a fault simulation (step S13).

As a result of execution of the fault simulation, the test patterns in which the undefined values X have been activated are checked for fault detection performance on a per-pattern-number basis. Test patterns are generated by discarding a pattern having a pattern number that does not detect faults and assigning undefined values to pins (columns) that do not participate in fault detection in a pattern that does detect faults.

The local CPU 10 accepts the pattern information from the remote CPU 20 and performs pattern merging (step S14). The local CPU 10 then determines whether the merged pattern information satisfies Predetermined final conditions (step S15). If the predetermined final conditions are satisfied, then the local CPU 10 outputs the merged pattern information (step S16).

If it is found at step S15 in FIG. 3 that the predetermined final conditions are not satisfied, then control returns to step S7, at which the remote CPU 20 transmits a test pattern to the remote CPU 20 again via the pattern information transmitting means 111 and transmits also initial-value setting information regarding a random-number sequence.

The local CPU 10 transmits a test pattern to the remote CPU 20 again via the pattern information transmitting means 111 at step S7 in FIG. 3. The test pattern used here is the result of pattern merging applied by the pattern merging means 114 of the local CPU 10 to the test patterns that have been generated by the repeated random-number fault simulations run by the respective plurality of remote CPUs 20. Alternatively, an arrangement may be adopted in which the repeated random-number fault simulations of the remote CPUs 20 are executed by changing the setting of the initial-value information of the random-number sequence using the original test pattern read into the apparatus by the pattern information read-in means 106 of the local CPU 10.

The plurality of remote CPUs 20 each again read in the circuit information, fault information and pattern information from the respective storage units (not shown) (steps S9–S11 in FIG. 3), generate a random-number sequence based upon the initial-value information of the random-number sequence transmitted from the local CPU 10, assign "0" or "1", depending upon the pseudo-random-number sequence, to the undefined values X in the test pattern transmitted from the local CPU 10 (step S12 in FIG. 3) and repeat the processing for fault simulation and assignment of undefined values to test patterns (step S13 in FIG. 3).

Thus, the repeated random-number fault simulation step is executed in parallel on a per-fault-group basis using the plurality of remote CPUs 20, and a pattern merging step is executed by the local CPU 10, whereby the processing time required for pattern compression is shortened in comparison with the conventional system.

In a case where a certain pin (column) of two patterns has the same value in the two patterns or at least one of the values is an undefined value, pattern merging performed by the pattern merging means 114 is such that one pattern is formed by employing the value that is not the undefined value X with relation to each pin, as described earlier with reference to FIG. 12.

In a case where the order of pattern merging is not appropriate, there is a possibility that the pattern length of test patterns will become greater than what it was prior to compression. In this embodiment of the present invention, therefore, pattern merging of the kind described below is used.

FIG. 4 is a schematic view useful in describing the method of pattern merging employed in this embodiment.

When test patterns #1–#3 from respective ones of remote CPUs #1–#3 are merged in order to achieve pattern compression, single test patterns are created by first merging patterns having identical pattern numbers among the test patterns #1–#3 generated in the respective remote CPUs #1–#3 by assigning undefined values X to input pins that do not participate in fault detection based upon the results of the repeated fault simulations in the respective remote CPUs #1–#3.

More specifically, as shown in (a) of FIG. 4, patterns (1), (4), (7) from the first rows of the test patterns #1, #2, #3, respectively, are merged to generate a single pattern [(1)+(4)+(7)] of the first row of test patterns in (b) of FIG. 4; patterns (2), (5), (8) from the second rows of the test patterns #1, #2, #3, respectively, are merged to generate a single pattern [(2)+(5)+(8)] of the second row of test patterns in (b) of FIG. 4; and patterns (3), (6), (9) from the third rows of the test patterns #1, #2, #3, respectively, are merged to generate a single pattern [(3)+(6)+(9)] of the third row of test patterns in (b) of FIG. 4. Note, here the row order (first, second, third) represents the pattern number for each CPU.

Next, patterns having different pattern numbers among the test patterns thus generated are merged, whereby it is so arranged that pattern length will not exceed that which prevailed prior to pattern compression.

More specifically, as shown in (c) of FIG. 4, the patterns of the second and third rows from the, test patterns of FIG. 4 (b) are merged so that a pattern length of three lengths prior to compression is reduced to a pattern length of two lengths after compression. The test patterns shown in FIG. 4(c) are output as the output pattern information 117.

It can be so arranged that pattern length will never exceed the pattern length prior to compression by using the same random-number sequence in the assignment of random values to the patterns that undergo fault simulation in each of the remote CPUs, merging the patterns having identical pattern numbers first and then merging the patterns having different pattern numbers.

The reason for this is that in case of patterns in which "0" or "1" has been assigned to undefined values in identical test patterns using entirely identical random-number sequences, the patterns having the same pattern numbers will satisfy the conditions that make merging possible. That is, in the case of a plurality of test patterns obtained by assigning "0" or "1" to the undefined values of test patterns in accordance with random numbers generated using identical initial values of the random numbers, the "0" values or "1" values that were given for the original undefined values X will match in the patterns having identical pattern numbers (i. e., in the test vectors having identical numbers). After the fault simulation, the conditions that allow merging will be satisfied even if the undefined values X have been assigned. In other words, it is because a plurality of patterns will have identical values for all pins or at least one of the values will be an undefined value.

By way of comparison, FIG. 5 illustrates a case where test patterns are generated in respective ones of remote CPUs #1–#3 by assigning undefined values X to input pins that do not participate in fault detection on the basis of repeated random-number fault simulations, the generated test patterns are merged separately within the remote CPUs #1–#3 and the resulting test patterns are then merged on the side of the local CPU 10. In this case, there are instances where pattern length exceeds that of the original test patterns, meaning that the desired compression efficiency cannot be attained.

Specifically, remote CPU #1 merges test patterns (1) and (2) of test patterns #1 to obtain a test pattern [(1+2) and (3)] the length whereof is equivalent to two pattern lengths; remote CPU #2 merges test patterns (4) and (6) of test patterns #2 to obtain a test pattern [(4+6) and (5)] the length whereof is equivalent to two pattern lengths; and remote CPU #3 merges test patterns (8) and (9) of test patterns #3 to obtain a test pattern [(7) and (8+9)] the length whereof is equivalent to two pattern lengths. If these three test patterns of two pattern lengths each are combined in the length direction by the local CPU 10, test patterns of six pattern lengths are obtained, as shown at (b) in FIG. 5. Among these test patterns, patterns (3), (5) and (8+9) are mergible with one another. The test patterns obtained by merging have a length equivalent to four pattern lengths, as shown at (c) in FIG. 5. This is one length longer than the three pattern lengths of the original test patterns.

In this embodiment of the present invention described above, it may be so arranged that when the fault dividing means 110 divides faults into the plurality of groups and assigns these fault groups to the plurality of remote CPUs, the fault groups are assigned in dependence upon the processing capability and load status of each remote CPU.

Furthermore, in order to deal with a situation in which the remote CPUs do not have equal capabilities or are loaded unequally, an arrangement can be adopted in which the number of groups into which the faults are divided by the fault dividing means 110 is made greater than the number of remote CPUs and a remote CPU that is in an idle state because it has a high processing capability and therefore has finished applying the repeated random-number fault simulation to its assigned fault group is provided with the next fault group.

By distributing load in such a manner that a fault simulation for detecting a large number of faults is carried out by a remote CPU having a high processing capability and a small load, it is possible to avoid a situation in which the processing time of the overall system is adversely affected by remote CPUs of low processing capability or remote CPUs under a heavy load.

Figure 6:
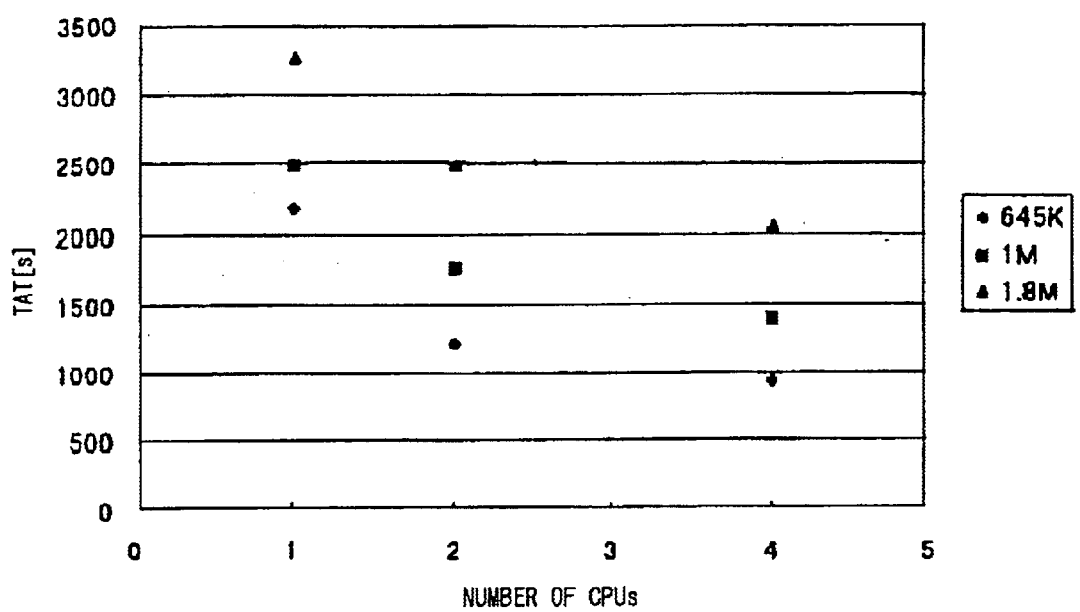
FIG. 6 is a diagram showing an example of compression processing using this embodiment.

FIG. 6, which is a diagram useful in describing the actions and effects of the present invention, illustrates a plot of number of remote CPUs which perform repeated random-number fault simulation versus test-pattern compression time (TAT: Turn-Around Time). The number of CPUs (1, 2, 4) is plotted along the horizontal axis, and the TAT (in seconds) of pattern compression processing is plotted along the vertical axis. The diamond, square and triangle symbols indicate logic circuits of 645 K ($K=10^3$), 1 M ($M=10^6$) and 1.8 M, respectively. The random-number fault simulation step and the pattern merging step were each performed twice and were executed at a target fault detection rate of 95%. FIG. 6 demonstrates that the TAT decreases as the number of CPUs is increased.

Figure 7:
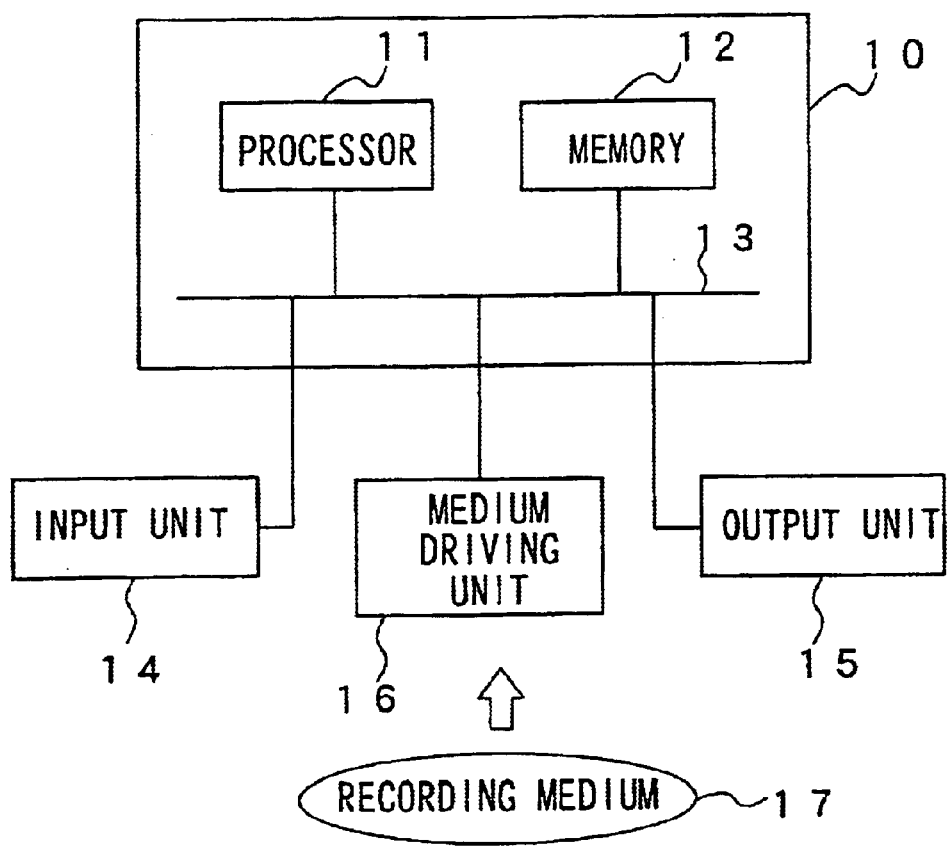
FIG. 7 is a block diagram of an apparatus according to this embodiment.
Figure 8:
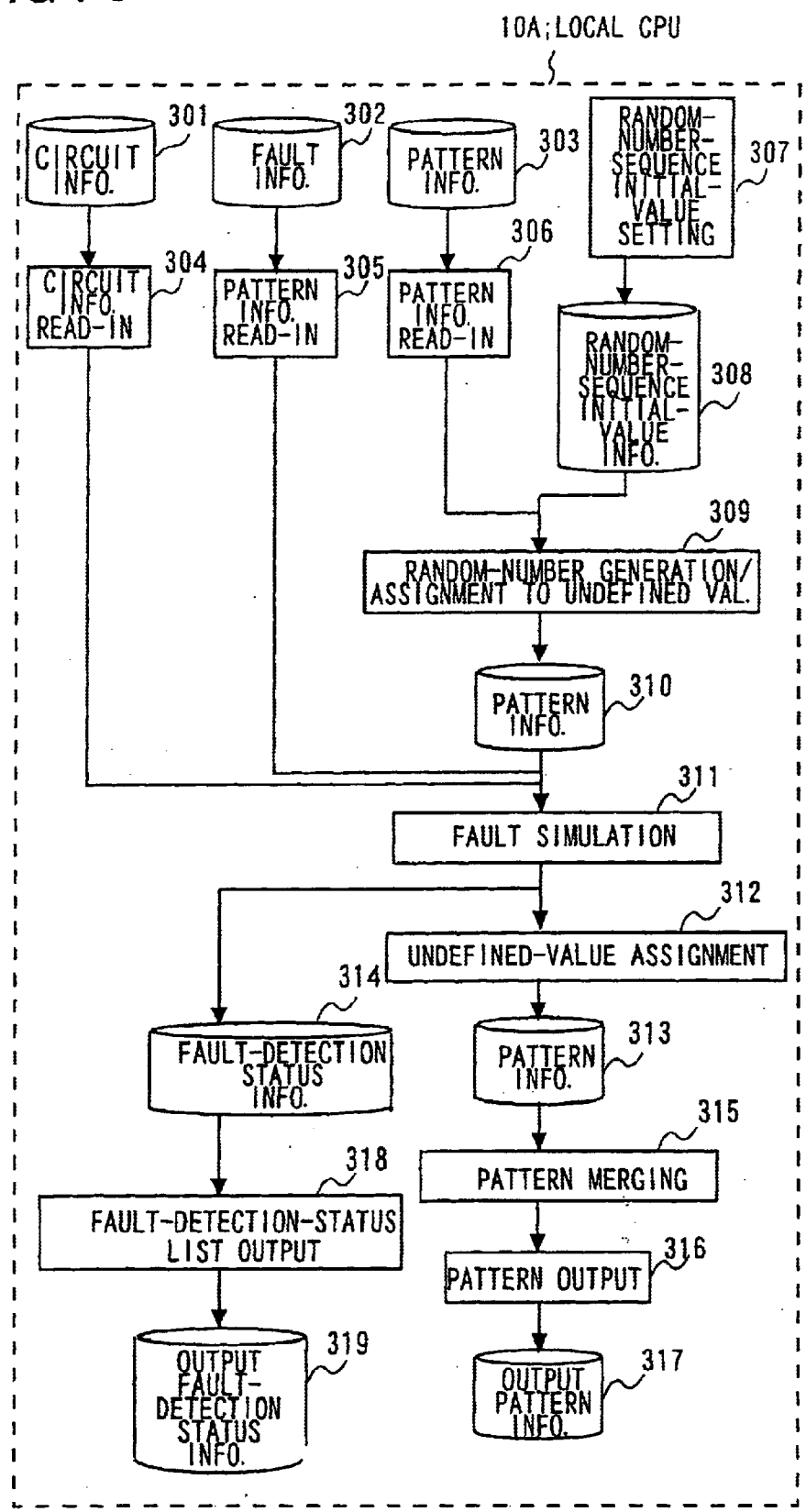
FIG. 8 is a diagram showing the configuration of a system according to a related art.
Figure 9:
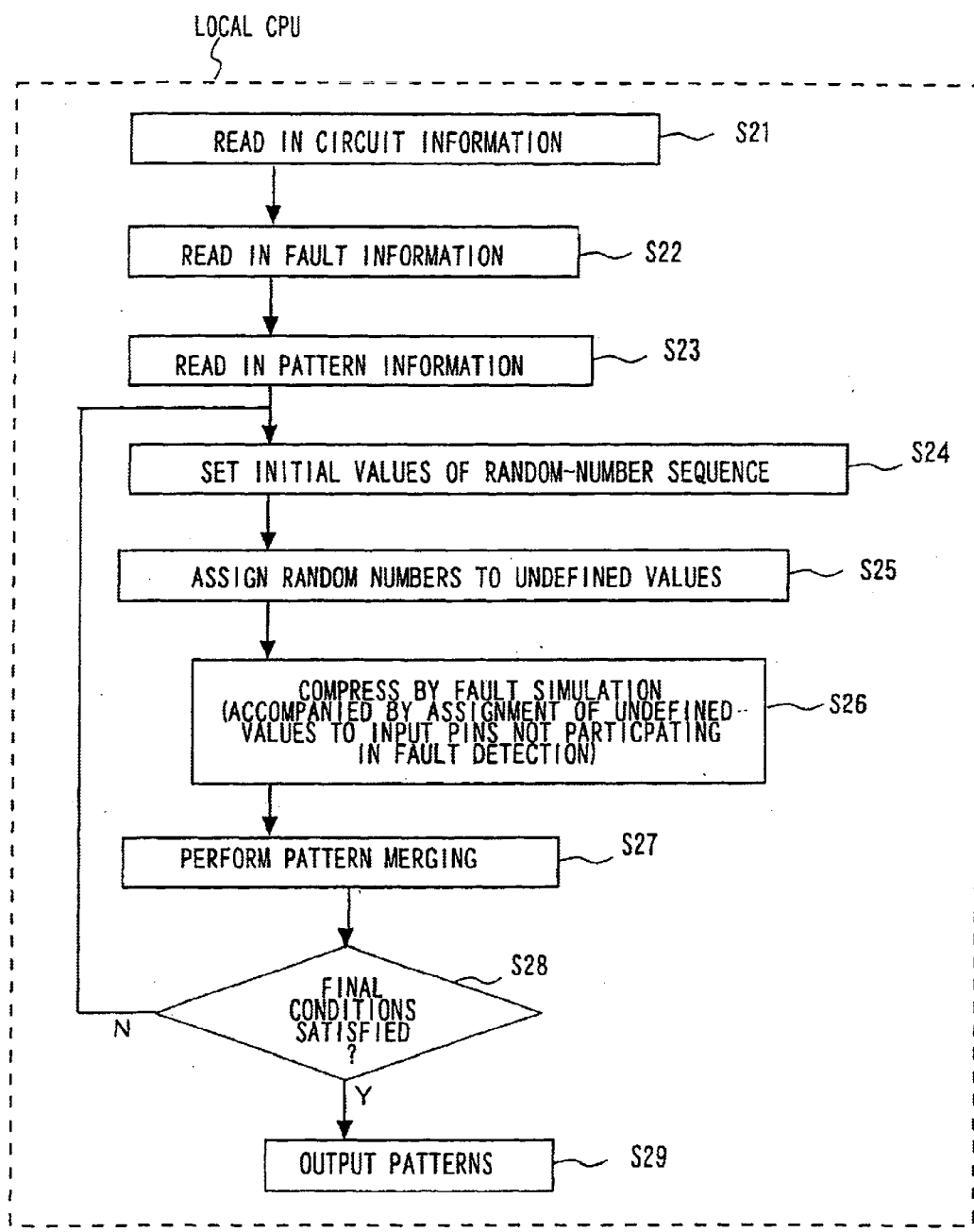
FIG. 9 is a flowchart of processing according to a system of a related art.
Figure 10A:
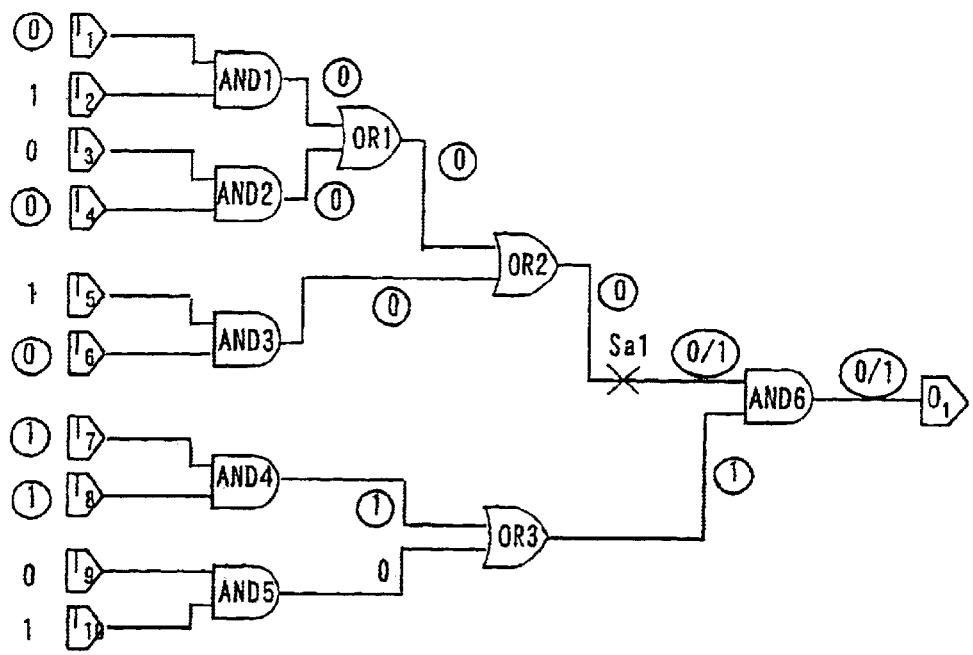
FIG. 10(a) is a diagram useful in describing a fault in a logic circuit (a combinational circuit) and FIG. 10(b) is a diagram useful in describing assignment of undefined values.
Figure 10B:
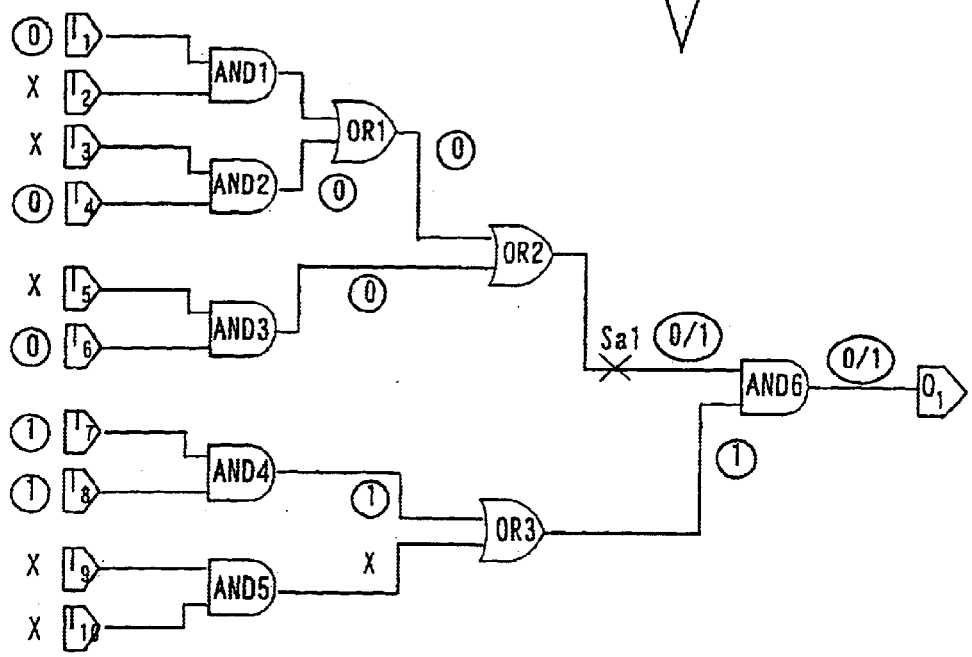
Figure 11:
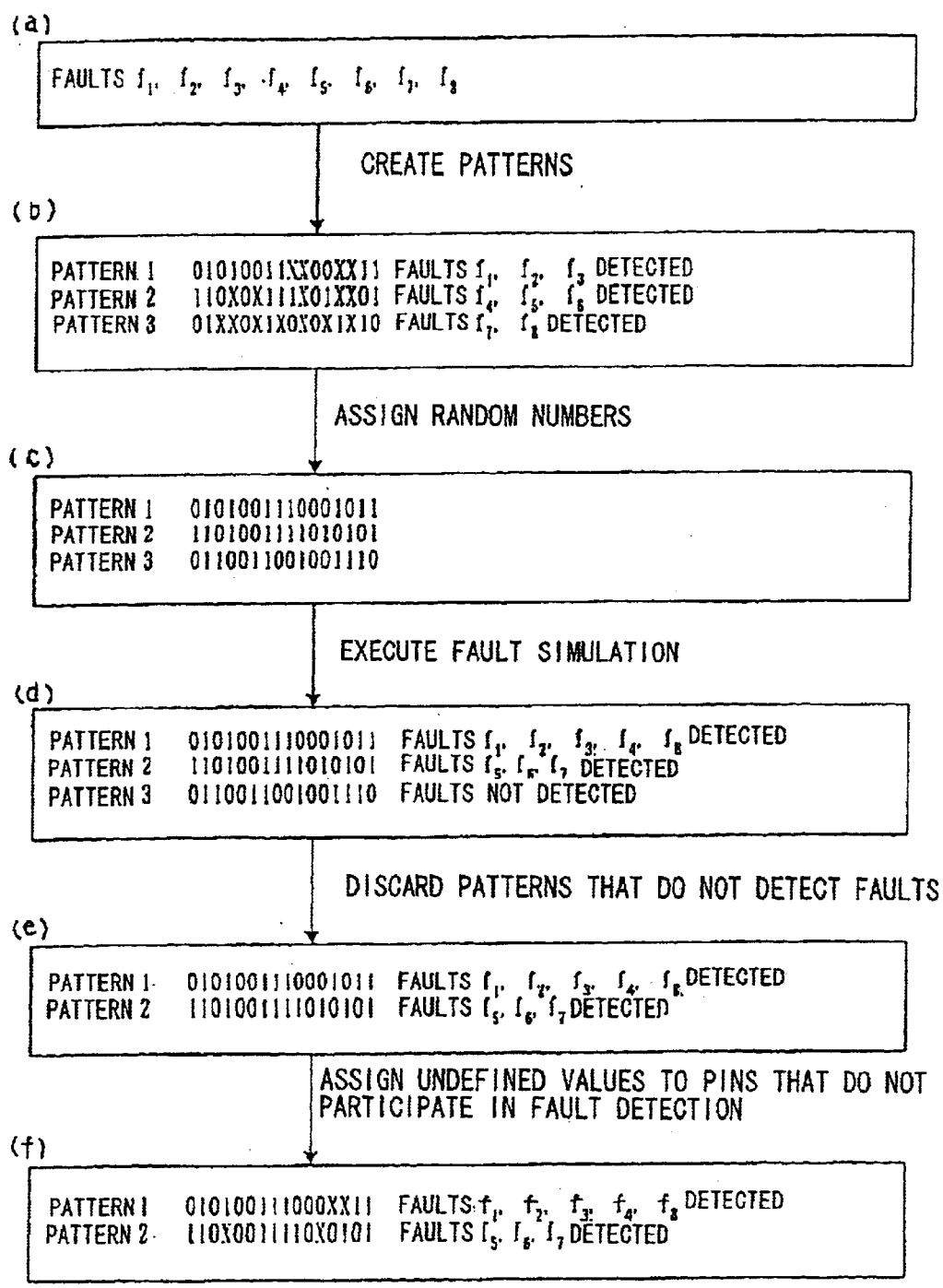
FIG. 11 is a diagram schematically illustrating the processing of a random-number fault simulation according to the related art.

FIG. 7 is a diagram illustrating the construction of a CPU according to the embodiment of the invention described above. FIG. 7 illustrates an example of the construction of the CPUs for implementing the functions of the read-in means 104–106, random-number-sequence initial-value setting means 107, fault dividing means 110, information transmitting means 109, 111, 113 and pattern merging means 114 in the local CPU 10 shown in FIG. 2 and the functions of the random-number generation and undefined-value assignment means 201, fault simulation means 203 and undefined-value assigning means 204 in the remote CPU 20 by executing the respective programs. More specifically, the present invention can be worked by reading out the content of a recording medium 17, on which has been recorded programs for implementing the processing and functions of the foregoing means, via a medium driving device 16, loading the content into a memory 12 such as a RAM, and executing, by a processor 11, the program instructions that have been stored in the memory 12. Accordingly, an input unit 14 inputs commands or data (circuit information, fault information and pattern information) to the processor 11. Further, an output unit 15 is a display unit or a printer or may be a file unit or communication device for outputting pattern information or the like.

In the embodiment described above, the arrangement is such that remote CPUs take charge of repeated random-number fault simulation while the local CPU distributes fault information, pattern information and random-number initial-value information to the remote CPUs and executes pattern merging. However, if the processing capability of the local CPU is such that this CPU has some leeway in terms of load, it may be so arranged that the local CPU performs the repeated random-number fault simulation together with the remote CPUs.

In the embodiment set forth above, the arrangement is such that the local CPU 10 transmits the. initial-value information concerning the random-number sequence to the plurality of remote CPUs 20, the initial-value information is made common use of by the plurality of remote CPUs 20, the random-number generation and undefined-value assignment means 201 of each remote CPU 20 executes an arithmetic operation (a function for generating pseudo-random numbers) $R_{n+1}=f(R_n)$ using the initial-value information as an initial random number R0, and the random-number sequence generated is made common use of by the plurality of remote CPUs 20. However, the present invention is not limited to this arrangement. That is to say, according to the present invention, it will suffice if the random-number sequence is made common use of by the plurality of remote CPUs 20. For example, an arrangement may be adopted in which the plurality of remote CPUs 20 prepare common random-number tables in respective ones of storage means (not shown) and select a random-number sequence commonly from these random-number tables, or in which the plurality of remote CPUs 20 each create a predetermined number of pseudo-random-number sequences in advance based upon common initial values and store these in respective ones of storage means (not shown), and the random-number generation and undefined-value assignment means 201 of the remote CPUs 20 successively select random numbers commonly from the random number at common positions with regard to the random-number sequence stored in each storage means, whereby "0" or "1" may be assigned to the undefined values in the test patterns.

As far as the processing of the fault simulation within one CPU the teachings of the prior art and the related art can be employed by selecting and combining elements of units, modules and/or process steps.

Particular reference is made of the disclosure of the preceding application JP No. 11-139144 which is herein incorporated by reference thereto.

As for assigning undefined values to test patterns and pattern merging, the disclosure of JP-A-8-212799 is incorporated herein by reference thereto, too.

The present invention as described above provides a number of effects, which will now be set forth.

One effect is that the time required for pattern compression in overall processing for generating test patterns automatically can be shortened significantly. This can be achieved because the present invention performs pattern compression by distributed processing using a plurality of CPUs.

A second effect is that there is no increase in pattern length caused by distributed processing, and the test patterns obtained have a pattern length equivalent to that in a case where distributed processing is not executed. The reason for this is that patterns having identical pattern numbers among the patterns created by distributed processing are merged first, after which patterns having different pattern numbers are merged.

A third effect is that an increase in the pattern length of test patterns can be avoided even though distributed processing is executed. As a result, there is no increase in the processing time needed for fault simulation and it is possible to prevent an increase in pattern compression time as well.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

Annexed herewith the copy of Japanese Patent Application No. 11-139144 filed on May 19, 1999 which will be laid-open after 18 months of the filing date.

What is claimed is:

1. A test pattern compression method for executing test pattern compression processing in a distributed manner by a plurality of parallel processing units, comprising:
    (a) a repeated random-number fault simulation step which includes:
        (a1) creating test patterns in which undefined values in test patterns that inspect a logic circuit for faults defined for the logic circuit have been activated by assigning "0" or "1" to these undefined values based upon a random-number sequence;
        (a2) running a fault simulation on said logic circuit using fault information and the test patterns in which the undefined values have been activated; and
        (a3) generating and outputting, on the basis of results of the fault simulation, test patterns having undefined values assigned to values for pins of said logic circuit that do not participate in fault detection in the test patterns in which the undefined values have been activated; and
    (b) pattern merging the test patterns generated and output by said repeated random-number fault simulation step (a); wherein
    (c) the faults defined for said logic circuit are divided into a plurality of fault groups and the fault groups are assigned to respective ones of said plurality of parallel processing units; and
    (d) said plurality of processing units execute the repeated random-number fault simulation step for said logic circuit in parallel with one another using the fault groups that have been assigned to respective ones of said processing units.

2. The method according to claim 1, wherein said plurality of processing units for executing said repeated random-number fault simulation step make common use of initial values that are for generating the random-number sequence, whereby the test patterns in which the undefined values have been activated are made identical in said repeated random-number fault simulation step executed in each of said processing units.

3. The method according to claim 1, wherein when the test patterns generated and output by said repeated random-number fault simulation step executed by respective ones of said plurality of processing units are subjected to pattern merging, test patterns having identical pattern numbers among pluralities of test patterns created by different processing units are merged first, whereby test patterns having a pattern length identical with that of the original test patterns prior to pattern merging are generated, then test patterns having different pattern numbers among these generated test patterns are subjected to pattern merging, whereby pattern length is reduced.

4. The method according to claim 1, wherein when the faults are divided into the plurality of fault groups and assigned to said plurality of processing units, assignment of the fault groups to said processing units is decided in dependence upon processing capability and/or load status of each of said processing units.

5. The method according to claim 1, wherein if, when the faults are divided into the plurality of fault groups, the number of fault groups is made larger than the number of said processing units and an idle processing unit exists among these processing units, control is exercised in such a manner that an unassigned fault group waiting to be processed is assigned to said idle processing unit.

6. A test pattern compression method comprising the steps of:
  (a) assigning "0" or "1" to undefined values in a test pattern or patterns, which are input to a plurality of processing units in common, by a sequence common to said plurality of processing units, thereby generating test patterns in which the undefined values have been activated;
  (b) running a fault simulation by each of said plurality of processing units connected in parallel with each other on a logic circuit under inspection by using faults, which have been defined for said logic circuit, divided into fault groups and assigned to corresponding ones of said processing units, as well as the test patterns in which the undefined values have been activated and circuit information relating to said logic circuit;
  (c) generating, by each of said plurality of processing units on the basis of results of the fault simulation, test patterns having undefined values assigned to values for pins of said logic circuit that do not participate in fault detection in the test patterns in which the undefined values have been activated; and
  (d) generating new test patterns by merging those test patterns, which have been generated by different processing units, that have identical pattern numbers among pluralities of test patterns generated by respective ones of said processing units, and then subjecting said new test patterns, which have different pattern numbers from one another, to pattern merging.

7. The method according to claim 6, wherein each of said plurality of processing units uses common initial values as initial values for generating a random-number sequence and assigns "0" or "1", on the basis of the random-number sequence that has been generated based upon the initial values, to undefined values in the test patterns input to said plurality of processing units in common, thereby generating test patterns in which the undefined values have been activated.

8. A test pattern compression method for executing test pattern compression processing in a distributed manner comprising:
  (a) providing one processing unit and $1^{st}$ to Nth (where N is a positive integer equal to or greater than 2) parallel processing units connected to said one processing unit and in parallel with each other,
  (b) the method further comprising the following steps executed by said first processing unit:
    (b1) dividing faults defined for a logic circuit to be inspected into a plurality of fault groups,
    (b2) assigning the fault groups to said $1^{st}$ to Nth processing units,
    (b3) supplying the fault groups to respective ones of the corresponding $1^{st}$ to Nth processing units, and
    (b4) supplying circuit information relating to said logic circuit, test patterns to undergo compression processing and initial-value information of a random-number sequence to said $1^{st}$ to Nth processing units;
  (c) the following steps being executed by each of said $1^{st}$ to Nth parallel processing units:
    (c1) generating test patterns in which undefined values in said test patterns to undergo compression processing have been activated by assigning "0" or "1" to these undefined values based upon a random-number sequence that has been generated from the initial-value information of the random-number sequence;
    (c2) inserting the divided faults into said logic circuit and running a fault simulation using the test patterns in which the undefined values have been activated; and
    (c3) checking fault detection performance of the test patterns in which the undefined values have been activated, on the basis of fault-detection result information obtained by the fault simulation, and generating test patterns having undefined values assigned to input pins of said logic circuit that do not participate in fault detection of said logic circuit in the test patterns in which the undefined values have been activated; and
  (d) the following steps being executed by said one processing unit:
    (d1) acquiring test patterns that have been generated by respective ones of said $1^{st}$ to Nth processing units,
    (d2) generating first test pattern(s) obtained by merging those test patterns, which have been generated by different processing units, and which have identical pattern numbers among said pluralities of test patterns acquired; and
    (d3) then attempting pattern merging among said generated first test patterns, which have different pattern numbers from one another.

9. The method according to claim 1, wherein the random-number sequence is obtained by an arithmetic operation based upon initial values, said random-number sequence being a pseudo-random-number sequence in which the same random-number sequence is reproduced for the same initial value.

10. The method according to claim 7, wherein the random-number sequence is obtained by an arithmetic operation based upon initial values, said random-number sequence being a pseudo-random-number sequence in which the same random-number sequence is reproduced for the same initial value.

11. The method according to claim 8, wherein the random-number sequence is obtained by an arithmetic operation based upon initial values, said random-number sequence being a pseudo-random-number sequence in which the same random-number sequence is reproduced for the same initial value.

12. A test pattern compression apparatus comprising:
  a plurality of processing units that are connected in parallel with each other and each of which includes:

(a) undefined value activation means for assigning "0" or "1" to undefined values in test patterns, which are input to said plurality of processing units in common, by a sequence common to said plurality of processing units, thereby generating test patterns in which the undefined values have been activated;

(b) fault simulation execution means for running a fault simulation on a logic circuit under inspection by using faults, which have been defined for said logic circuit, divided into fault groups and assigned to corresponding ones of said processing units, as well as the test patterns in which the undefined values have been activated and circuit information relating to said logic circuit; and (c) undefined value assignment means for generating, on the basis of results of the fault simulation, test patterns having undefined values assigned to values for pins of said logic circuit that do not participate in fault detection in the test patterns in which the undefined values have been activated;

(d) said apparatus further including a processing unit acquiring pluralities of test patterns that have been generated by respective ones of said plurality of processing units, and generating new test patterns by merging those test patterns, which have been generated by different processing units, and which have identical pattern numbers among said pluralities of test patterns acquired, and then subjecting said new test patterns, which have different pattern numbers from one another, to pattern merging.

13. The apparatus according to claim 12, wherein said undefined value activation means in each of said plurality of processing units uses common initial values as initial values for generating a random-number sequence and assigns "0" or "1", on the basis of the random-number sequence that has been generated based upon the initial values, to undefined values in the test patterns input to said plurality of processing units in common, thereby generating test patterns in which the undefined values have been activated.

14. A test pattern compression apparatus, which comprises one processing unit and $1^{st}$ to Nth (where N is a positive integer equal to or greater than 2) processing units connected to said one processing unit and in parallel with each other, configured for compressing and outputting test patterns, wherein said one processing unit has fault dividing means for dividing faults defined for a logic circuit to be inspected into a plurality of fault groups and assigning the fault groups to said $1^{st}$ to Nth processing units, said one processing unit supplying the fault groups to respective ones of the corresponding $1^{st}$ to Nth processing units and supplying circuit information relating to said logic circuit, test patterns to undergo compression processing and initial-value information of a random-number sequence to said $1^{st}$ to Nth processing units;

(a) each of said $1^{st}$ to Nth processing units having:
  (a1) means for generating test patterns in which undefined values in the test patterns have been activated by assigning "0" or "1" to these undefined values based upon a random-number sequence that has been generated from the initial-value information of the random-number sequence;
  (a2) means for inserting the divided faults into said logic circuit and running a fault simulation using the test patterns in which the undefined values have been activated; and
  (a3) undefined-value assignment means for checking fault detection performance of the test patterns in which the undefined values have been activated, on the basis of fault-detection result information obtained by the fault simulation, and generating test patterns having undefined values assigned to input pins of said logic circuit that do not participate in fault detection of said logic circuit in the test patterns in which the undefined values have been activated; and (b) said one processing unit further having pattern merging means for acquiring pluralities of test patterns that have been generated by said undefined-value assignment means of respective ones of said $1^{st}$ to Nth processing units, generating first test patterns obtained by merging those test patterns, which have been generated by different processing units, that have identical pattern numbers among the pluralities of test patterns acquired, and then attempting merging among the generated first test patterns, which have different pattern numbers from one another.

15. The apparatus according to claim 14, wherein said fault dividing means decides assignment of the fault groups to said processing units in dependence upon processing capability and/or load status of each of said processing units.

16. The apparatus according to claim 14, wherein if the number of fault groups is made larger than the number of said processing units and an idle processing unit exists among these processing units, then said fault dividing means assigns, to said idle processing unit, a fault group that has not yet been assigned to a processing unit and that is waiting to be processed.

17. The apparatus according to claim 13, wherein the random-number sequence is obtained by an arithmetic operation based upon initial values, said random-number sequence being a pseudo-random-number sequence in which the same random-number sequence is reproduced for the same initial value.

18. The apparatus according to claim 14, wherein the random-number sequence is obtained by an arithmetic operation based upon initial values, said random-number sequence being a pseudo-random-number sequence in which the same random-number sequence is reproduced for the same initial value.

19. A distributed processing apparatus for compressing and outputting test patterns, comprising:
a local CPU and a plurality of remote CPUs connected to said local CPU and in parallel to each other;
(a) wherein said local CPU includes:
  (a1) circuit information read-in means for reading in circuit information relating to a logic circuit to be inspected;
  (a2) fault information read-in means for reading in fault information;
  (a3) pattern information read-in means for reading in test patterns;
  (a4) transmitting means for transmitting the read-in circuit information to said plurality of remote CPUs;
  (a5) transmitting means for transmitting the test patterns to said plurality of remote CPUs;
  (a6) fault dividing means for dividing the read-in fault information into a plurality of fault groups in conformity with the number of said remote CPUs;
  (a7) transmitting means for transmitting the grouped fault information to corresponding remote CPUs group by group;
  (a8) means for setting initial-value information of a random-number sequence; and
  (a9) means for transmitting the initial-value information of the random-number sequence to each of said remote CPUs; and (b) each of said remote CPUs includes:

(b1) undefined value activation means for generating a random-number sequence based upon the initial-value information of the random-number sequence, which has been received from said local CPU, and assigning "0" or "1" to undefined values in test patterns, which have been transmitted from said local CPU, based upon random-number values, thereby generating test patterns in which the undefined values have been activated;

(b2) means for inserting the divided faults into said logic circuit and running a fault simulation using the test patterns in which the undefined values have been activated;

(b3) undefined value assignment means for checking fault detection performance of the test patterns in which the undefined values have been activated, on the basis of fault-detection result information obtained by the fault simulation, and generating test patterns having undefined values assigned to input pins of said logic circuit that do not participate in fault detection of said logic circuit in the test patterns in which the undefined values have been activated; and (b4) said local CPU further includes pattern merging means for acquiring pluralities of test patterns that have been generated by said undefined value assignment means of respective ones of said plurality of remote CPUs, generating first test patterns obtained by merging those test patterns, which have been generated by different processing units, and which have identical pattern numbers among said pluralities of test patterns acquired, and then attempting pattern merging among said generated first test patterns, which have different pattern numbers from one another.

20. The system according to claim 19, wherein the random-number sequence is obtained by an arithmetic operation based upon initial values, said random-number sequence being a pseudo-random-number sequence in which the same random-number sequence is reproduced for the same initial value.

21. A program product for operating a test pattern compression apparatus, which comprises one processing unit and $1^{st}$ to Nth (where N is a positive integer equal to or greater than 2) processing units connected to said one processing unit and in parallel with each other, for compressing and outputting test patterns, said program product having a program for causing said one processing unit to execute the following steps (a) to (c):

(a) a dividing step of dividing faults defined for a logic circuit to be inspected into a plurality of fault groups and assigning the fault groups to said $1^{st}$ to Nth processing units;

(b) a step of supplying the divided fault groups to respective ones of said $1^{st}$ to Nth processing units and for supplying circuit information relating to said logic circuit, test patterns to undergo compression processing and initial-value information relating to generation of a random-number sequence to said $1^{st}$ to Nth processing units; and (c) a step of acquiring pluralities of test patterns that have been generated by respective ones of said $1^{st}$ to Nth processing units, generating first test patterns obtained by merging those test patterns, which have been generated by different processing units, that have identical pattern numbers among said pluralities of test patterns acquired, and then attempting pattern merging among said generated first test patterns, which have different pattern numbers from one another; and said program product further having a program for causing each of said $1^{st}$ to Nth processing units to execute the following steps (d) to (f) in parallel:

(d) a step of generating test patterns in which undefined values in the test patterns transmitted from said one processing unit have been activated by generating a pseudo-random-number sequence from the initial-value information relating to the generation of the random-number sequence and assigning "0" or "1" to the undefined values;

(e) a step of inserting the divided faults into said logic circuit and running a fault simulation using the test patterns in which the undefined values have been activated; and (f) a step of checking fault detection performance of the test patterns in which the undefined values have been activated, on the basis of fault-detection result information obtained by the fault simulation, and generating test patterns having undefined values assigned to values of input pins of said logic circuit that do not participate in fault detection of said logic circuit in the test patterns in which the undefined values have been activated.

22. A medium carrying thereon said program product according to claim 21.

23. The medium according to claim 22, wherein said medium comprises a recording medium.

* * * * *